June 15, 1943. L. SIBAL 2,321,631
FLUID PRESSURE CONTROLLING APPARATUS
Filed March 4, 1941 2 Sheets-Sheet 1
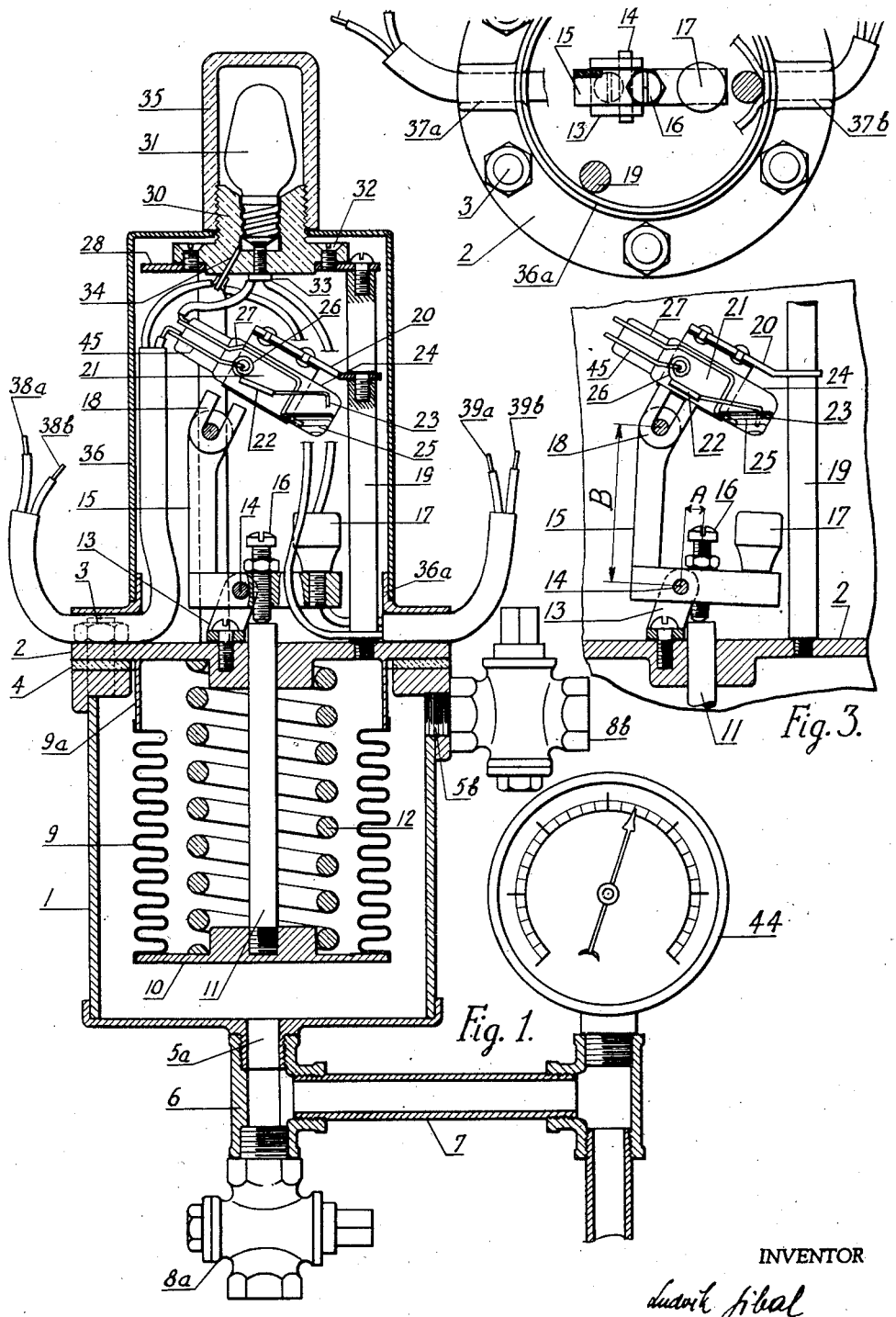
INVENTOR
Ludvik Sibal

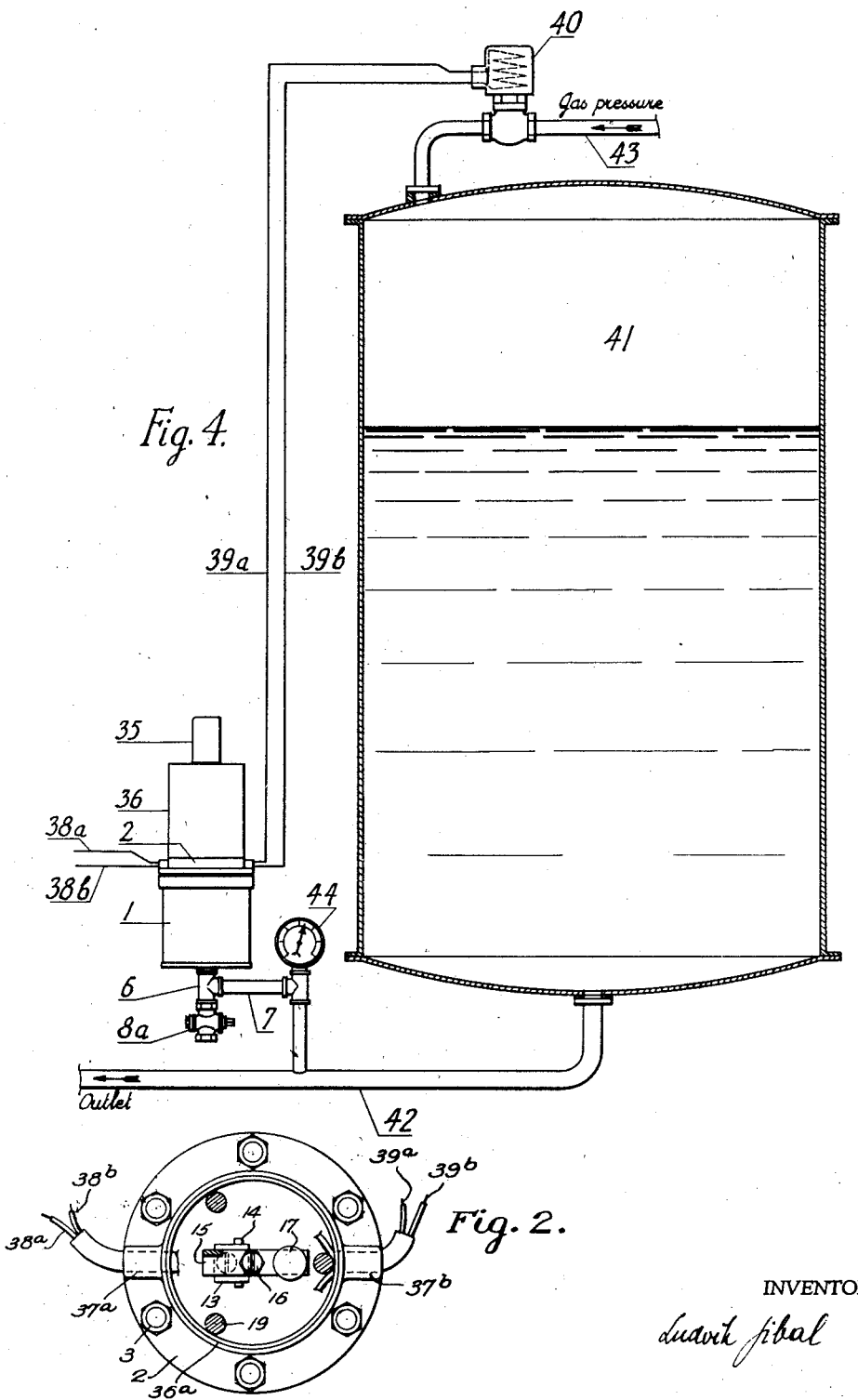

Patented June 15, 1943

2,321,631

UNITED STATES PATENT OFFICE

2,321,631

FLUID PRESSURE CONTROLLING APPARATUS

Ludvik Sibal, Long Island City, N. Y.

Application March 4, 1941, Serial No. 381,652

3 Claims. (Cl. 177—311)

This invention relates to improvements of fluid pressure controlling apparatuses (gases, liquids, etc.) and it is the principal object of the invention to provide means for adding gas or liquid pressure to containers from which their contents are being discharged at such a rate that the total pressure head at the point where the fluid flows out of said containers remains practically constant even during the discharge period.

This apparatus is constructed with the special object in view of making it applicable to the so-called government tanks in the breweries, from which beer is being drawn to the bottle- or can filling machines. In these tanks the beer stands under a gaseous pressure (air or otherwise) the level of which is so chosen as to insure a smooth filling process by the filling machine to which the beer is discharged from the government tanks. The pressure at the filling machine must be kept constant during the filling process and therefore it is necessary and important that the pressure at the point of flow out of the government tanks likewise be kept constant. The total pressure at the point of discharge from the government tanks is composed of two components: (1) the weight of the beer and (2) the gas pressure within said tanks. As the beer is being drawn from the tanks, the total pressure head causing flow at the point of discharge from the tanks is being decreased due to the decreasing weight of the beer. To make up for this loss in pressure head, gas pressure must be supplied to the tanks until the original desired total pressure head is again reached at the point of discharge. This is usually accomplished by a control man whose duty it is to sight the presssure gauge reading or beer level and to adjust the gas valve accordingly.

The main purpose of this apparatus is to eliminate the human factor of such pressure regulation thus making the regulation as nearly free from all human errors and neglects as is humanly possible. Also my design is such that it is best applicable to breweries and other enterprises where apparatus of this kind must withstand severe mistreatment and where it is necessary to thoroughly wash its interior as well as exterior.

This invention provides an apparatus which, when connected by means of a conduit such as a pipe or a hose to the point at which the discharge occurs from a tank, throws on or off a sensitive snap-action electric (magnetic) mercury switch whenever the pressure head changes slightly in the tank at the point of discharge. This snap action switch is connected by means of electric conduits to a solenoid valve in the gas line leading to the tank, and when contact is made, the solenoid valve is actuated by the electric current so that it opens and admits the gas to flow into the tank thus increasing the total pressure head to the original desired level. As soon as this desired total pressure head is reached, the snap action switch automatically turns off and the gas valve closes.

Another object of this invention is constructive incorporation of an electric light connected in parallel with the solenoid valve circuit and attached to the apparatus as a part of it, which glows while the mercury switch is closed thus indicating that the apparatus and the solenoid valve are in operation.

The details of this apparatus are shown on the accompanying drawings on which:

Fig. 1 is vertical half section through the apparatus.

Fig. 2 is a top plan view of the apparatus with the protective cover removed.

Fig. 3 shows the position of the mercury switch when the circuit has been closed and the apparatus is in operation.

Fig. 4 is a diagram showing electric and pipe connections of the apparatus.

As illustrated, the apparatus is constructed as follows: housing 1 is capped with a cover 2 which is fastened to the housing 1 by means of a plurality of screws 3. A gasket 4 makes the closure between the housing and the cover gas- and liquid tight. The bottom of the housing 1 is provided with an opening 5a and T-shaped joint 6 to which a pipe 7 is attached connecting the apparatus with the point of discharge from the tank where the pressure is to be kept constant. Cocks 8a and 8b attached to the openings 5a and 5b serve the purpose of making it possible to flush the inside of the apparatus with water in order to clean it. The bellows 9 is soldered or otherwise tightly secured to the protruding flange 9a of the cover 2 so that the bellows itself protrudes into the housing 1. The bottom 10 provides a tight seal of the bellows and the rod 11 extends from it upward through an opening in the center of the cover 2. A spring 12 located inside of the bellows gives it a stiffer spring action.

On the upper side of the cover 2 a bracket 13 with a pivot pin 14 holds a lever 15 which can swing freely around the pin 14. The horizontal arm of the lever 15 is provided with a screw 16 located coaxially with the rod 11 of the bellows 9 and the weight 17 tends to press lever 15 and the screws 16 against rod 11. The vertical arm of lever 15 carries on its upper end a permanent magnet 18. Distance A of the screw 16 from pivot 14 is much smaller than distance B of the magnet 18 to pivot 14. If the rod 11 together with the bottom 10 of the bellows 9 moves upward under gas- or liquid pressure existing inside of the housing 1, this movement is transmitted to the lever 15 through screw 16 which is in contact with rod 11. Even a slight movement of rod 11 and screw 16 then results in longer travel of magnet 18, the travel of the screw 16 being multiplied in proportion as the distance B is to the distance A, or $B:A$. The result of this arrangement is that the apparatus is sensitive even to very slight changes of pressure to which the bellows 9 and 10 of the apparatus is subjected.

To the cover 2 there is fastened a plurality of pillars 19. One of them carries a bracket 20 with magnetic mercury switch 21 of standard design encased in a glass enclosure 24. This switch is so located, that it can be operated by the magnet 18 if said magnet moves with the lever 15 in proper direction. The pillars 19 carry on their upper ends a plate 28 which is fastened to them by means of screws or by some other means. To this plate a socket 30 with electric bulb 31 is attached by means of a plurality of screws 32 or otherwise. The electric current is allowed to flow to the bulb by means of a contact screw 33 and a contact wire 34. Transparent cover 35 fits over the threaded part of the socket 30. This cover serves the double purpose of protecting the bulb 31 and keeping in place a removable protective cover 36 of preferably a tubular form which encases and protects the switch mechanism. The bottom part of the protective cover 36 fits over a correspondingly formed protruding flange 36a of the cover 2 and as it is pressed downward by screwing in the transparent cover 35, it makes the closure of the switch mechanism dust proof.

The electric conduits 38a and 38b pass through the opening 37a in the flange 36a bringing the electric current to the apparatus, and the electric conduits 39a and 39b pass through the opening 37b in the flange 36a leading the electric current to the solenoid valve 40 of standard design, which valve is connected into the gas line 43 through which the gas flows into the tank 41.

The operation of the apparatus will be apparent from the following description:

From the tank 41 beer or other liquid is discharged through pipe 42 to the bottle- or can filling machine or other similar-purpose equipment. A gas pressure exists above the beer, the same gas being admitted into the tank through pipe 43 in which a solenoid valve 40 is connected and which valve closes or opens the passage to the flow of this same gas. At the point of discharge from the tank there exists a pressure equal to the sum total of the pressure due to the weight of the liquid and the gas pressure. This total pressure head is shown by a pressure gauge 44 attached to the pipe 7 connecting the apparatus with the tank. Inside of the apparatus, bellows 9, 10 is subjected to this total pressure head and is correspondingly compressed. The screw 16 resting against the rod 11 is so adjusted that the magnet 18 of the lever 15 is held at such a distance from the mercury switch 21 that its iron armature 22 is not yet being attracted by the magnetic force, the contact point 23 is therefore kept clear of the mercury 25, the electric current is interrupted, the solenoid valve 40 is closed and the gas pressure within the tank 41 remains constant.

As the liquid is being discharged through pipe 42, its weight in the tank 41 is diminishing. This results in the lowering of the total pressure head at the point of discharge from the tank to which pressure the bellows 9, 10 is subjected. This pressure head being lowered, the bellows 9 expands correspondingly due to its own elasticity and due to the tension in the spring 12, and thus the bottom 10 of the bellows 9 and rod 11 move downward. Screw 16 follows the movement of the rod 11 because said screw is forced down by weight 17, lever 15 swings around the pivot 14 so that the magnet 18 approaches the mercury switch 21 until it attracts the iron armature 22 of the switch. This armature moves toward the magnet and the contact point 23 is dipped into the mercury 25. Electric contact is thus effected with the following result: Electric current passes from its original source by conduit 38a, through the connecting wire 45 to the switch 21, then through the spring 26, armature 22, contact point 23, mercury 25, connecting wire 27, contact screw 33 on the socket 30, through bulb 31 which starts to glow, contact wire 34 and the conduit 38b back to the opposite pole of the original source of electric current. From the contact screw 33 the current branches off to the wire 39a which wire conducts it to the solenoid valve 40 in the gas line 43. This valve immediately opens by a magnetic force created by the passage of the current through its solenoid, and the gas passes freely through the gas line 43 to the tank 41 thus increasing the total pressure in the tank. From the solenoid valve 40 the current returns through conduits 39b and 38b to its original source.

As the pressure inside of the tank 41 is thus being increased, this increase in pressure is transmitted through the discharge pipe 42 and pipe 7 to the bellows 9, and results in correspondingly lifting the bottom 10 of the bellows 9 with rod 11. This upward movement is transmitted to the screw 16 and lever 15 with the result that it brings the magnet 18 away from the mercury switch 21 until the magnet loses its magnetic pull over the iron armature 22, which armature then swings back due to the force of the spring 26. The contact point 23 emerges from the mercury 25, the flow of electric current is thus interrupted and the bulb 31 stops glowing. The solenoid valve 40 closes and the passage of gas through line 43 to the tank 41 is shut off. This cycle repeats again as the contents of the tank 41 are steadily discharged and as the pressure at the point of discharge from the tank again fluctuates from the original desired total operating pressure head.

In order to regulate the pressure which is to be maintained by the apparatus, the screw 16 has to be adjusted. If turned in one direction so that the rod 11 must travel a greater distance in order to come in contact with the screw 16, the pressure will be increased because a higher pressure is required in order to force the bellows 9, 10 sufficiently to bring the rod 11 over the longer distance in contact with the screw 16 and thus operate the switch and vice versa.

It will be understood that the apparatus according to the invention as described herein is representing an example only of the many possible ways to construct the same in practice and that changes in its general arrangement and in the construction of its minor details as come within the scope of the appended claims may be made without departure from the scope and spirit of the invention and the principles involved.

Having thus described the invention what is claimed as new and desired to be protected by Letters Patent is:

1. In a pressure regulating apparatus of the class described, a bellows, a housing enclosing the bellows, a cover closing tightly the housing, the bellows being tightly secured to the cover, a rod fastened to the bottom of the bellows and extending upward through a hole in the cover, a linkage mounted pivotally on the cover and transmitting the movements of said rod, an adjusting screw threaded into the substantially horizontal part of the linkage, the distance between the pivot and the adjusting screw forming the shorter arm of the linkage, the bottom end of said adjusting screw resting against the upper face of the movement-transmitting rod, a counterweight fastened to the substantially horizontal arm of the linkage, a pin about which the linkage pivots, a bracket holding the pin and fastened to the cover of the housing by means of a screw or some other simple means, a magnet held by the upper end of the substantially vertical longer arm of the linkage, a magnetically operated electric switch actuated by said magnet.

2. In a pressure regulating apparatus of the class described, a spring-strengthened bellows the bottom of which moves under the slightest changes of pressure, a rod fastened to the bottom of the bellows and extending upward, a housing enclosing the bellows, a cover of the housing to which cover the bellows is tightly secured, a hole in the cover through which said rod extends, a number of pillars extending upward from said cover and fastened securely to it, a bracket fastened to one or several pillars, a magnetically operated electric switch fastened to said bracket, a pivotally supported linkage a magnet operating the switch fastened to the upper end of the substantially vertical longer arm of the linkage, an adjusting screw in the shorter and substantially horizontal arm of the linkage, the screw being engaged by the top of the rod extending from the bottom of the bellows, this adjusting screw making it possible to regulate the distance between the rod and the linkage thus regulating the pressure at which the switch is actuated.

3. A pressure regulating apparatus of the class described, incorporating a bellows, a housing encasing the bellows, a magnetically operated electric switch, a mechanism which actuates the switch with the slightest changes of pressure to which the bellows is subjected, a cover closing the housing and having the bellows tightly secured to itself, a number of pillars extending upward from the cover and fastened securely to it, a ring fastened to the upper ends of the pillars, an insulated socket fastened to the ring in a suitable manner, the socket being provided on its outside with threads, a cap threaded on the inside fitting over the socket, a shell of preferably tubular form as a closure over the switching mechanism, the bottom part of the shell fitting over a correspondingly formed protruding part of the cover of the housing, the upper part of the shell being provided with a hole in its center which fits over the threaded part of the socket, the shell being held tightly against the cover of the housing by the threaded cap made preferably of transparent material to make it possible to observe the glow of the bulb inserted in the socket.

LUDVIK SIBAL.